(12) United States Patent
Zhou

(10) Patent No.: US 7,222,989 B2
(45) Date of Patent: May 29, 2007

(54) COMPUTER PERIPHERAL DEVICE ARRANGED TO EMIT A HOMOGENEOUS LIGHT

(75) Inventor: Yu-Tang Zhou, Taipei (TW)

(73) Assignee: Kye Systems Corporation, Taipei (TW)

( * ) Notice: Subject to any disclaimer, the term of this patent is extended or adjusted under 35 U.S.C. 154(b) by 10 days.

(21) Appl. No.: 11/012,281

(22) Filed: Dec. 16, 2004

(65) Prior Publication Data

US 2006/0132439 A1    Jun. 22, 2006

(51) Int. Cl.
*F21S 6/00* (2006.01)
(52) U.S. Cl. .................. 362/257; 345/163; 362/296; 362/341; 362/362; 362/800
(58) Field of Classification Search ............. 362/154, 362/257, 296, 341, 363, 362, 85, 800; 345/166, 345/164, 167, 163
See application file for complete search history.

(56) References Cited

U.S. PATENT DOCUMENTS

| | | | |
|---|---|---|---|
| 5,530,455 A | 6/1996 | Gillick et al. | 345/163 |
| 6,486,873 B1* | 11/2002 | McDonough et al. | 345/163 |
| 6,547,420 B2 | 4/2003 | Li | 362/253 |
| 6,927,759 B2* | 8/2005 | Chang et al. | 345/166 |
| 2004/0233659 A1* | 11/2004 | Chen | 362/85 |

* cited by examiner

*Primary Examiner*—Renee Luebke
*Assistant Examiner*—Gunyoung T. Lee
(74) *Attorney, Agent, or Firm*—Bacon & Thomas, PLLC

(57) ABSTRACT

A computer peripheral device includes a body, a printed circuit board (PCB), a light source, and a reflecting device within the body arranged to cause light to be emitted from the body in a homogeneous manner.

4 Claims, 6 Drawing Sheets

COMPUTER PERIPHERAL DEVICE ARRANGED TO EMIT A HOMOGENEOUS LIGHT

BACKGROUND OF THE INVENTION

1. Field of the Invention

The present invention relates to a computer peripheral device, and in particular to a peripheral device that emits a homogeneous or uniform light therefrom.

2. Description of the Prior Art

Computer peripheral devices, including but not limited to a computer mouse, trackball, keyboard, wireless receiver, hub, card reader, or mainframe, are well developed in function due to the successive advances in electronic technology. As a result, there are limited opportunities for enhancing market appeal by improving function. Instead, manufacturers have begun to concentrate on providing an enchanting appearance so as to satisfy the customer.

Besides providing various shapes and colors of the peripheral housing, the appearance of the peripheral devices can be improved by projecting light from the inside of the housing to create a surprising variety of visional effects. The known prior art disclosed in U.S. Pat. No. 6,547,420 is a light emitting input device that utilizes a light emitting diode (LED) as a light source in the housing. However, the projected area is too narrow to light the whole housing evenly. Even if the number of LEDs is increased, the housing of the device still rudely shows light spots corresponding to the number of LEDs in the housing. In addition, the heat generated by the LEDs is of serious concern as it can damage the whole electronic device.

SUMMARY OF THE INVENTION

It is accordingly an objective of the present invention to provide a peripheral device which emits a homogeneous or uniform light from the housing.

To accomplish the objective mentioned above, the peripheral device comprises a body, a printed circuit board (PCB), a light source, and a reflecting device within the body.

DETAILED DESCRIPTION OF THE PREFERRED EMBODIMENTS

Figure 1:
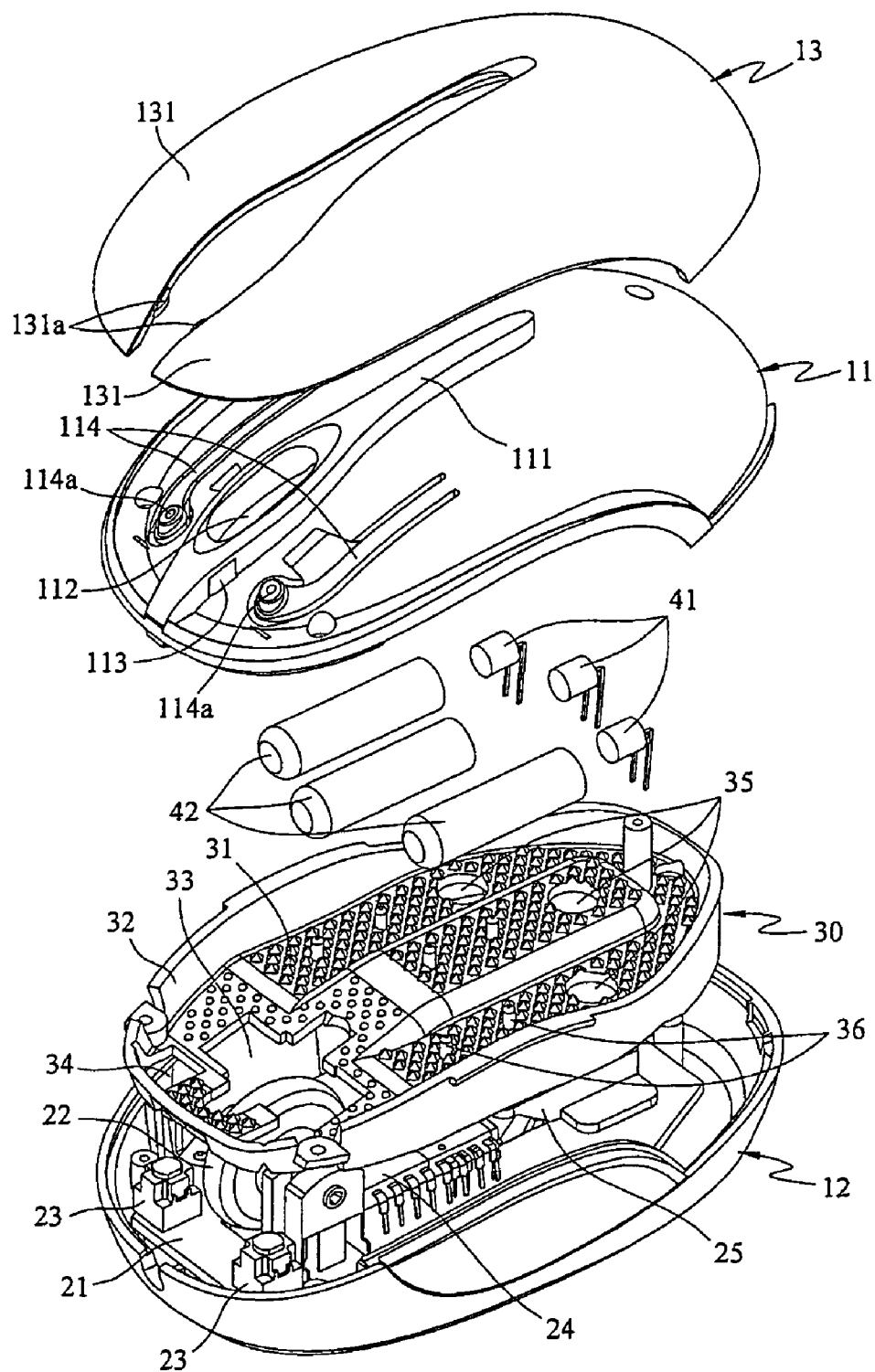
FIG. 1 is an exploded perspective view of a peripheral device constructed in accordance with the principles of a first preferred embodiment of the invention.
Figure 2:
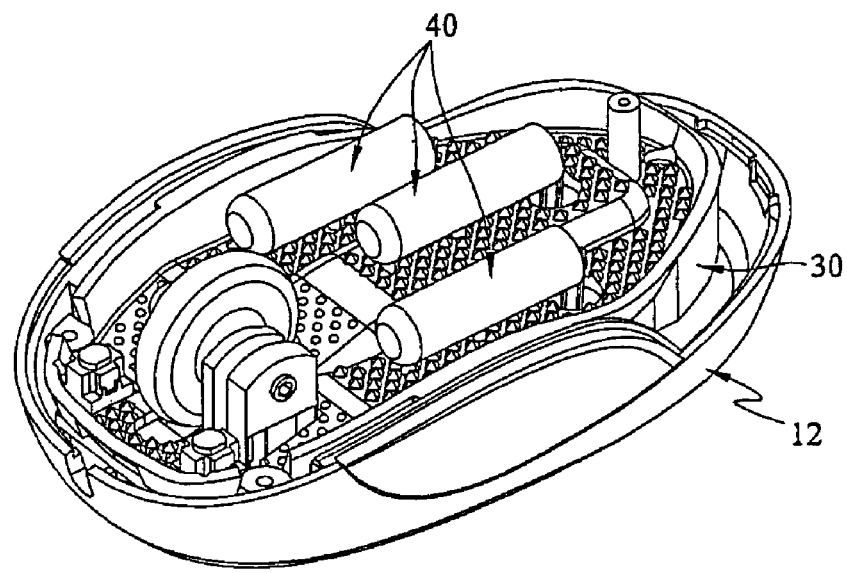
FIG. 2 is a perspective view of a lower part of the peripheral device of the first preferred embodiment.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. Therefore, the computer peripheral devices mentioned in the invention include but not limited to a computer mouse, trackball, keyboard, wireless receiver, hub, card reader, or a mainframe.

Referring to FIG. 1~4, the peripheral device is illustrated by a mouse, which comprises a body 10 including an upper housing 11, a lower housing 12, and a button plate 13. The upper housing 11, the lower housing 12, or the button plate 13 can be made of a transparent, translucent, or opaque material, and/or painted to create desired visual effects. Also the surface of the body 10 can be further processed to form a smooth, rough or foggy effect. In addition, visual effects can be created following the skill disclosed in U.S. Pat. No. 6,547,420 to display a trademark or logo thereon.

The body 10 further comprises a PCB 21 for furnishing essential known functions of the mouse, a roller 22, microswitches 23, and a coordinate detecting module 24 and 25 that couples to the PCB 21. Briefly, the mouse may be functionally similar to the roller mouse described in U.S. Pat. No. 5,530,455, incorporated herein by reference.

A reflecting device 30 positioned over the PCB 21 has a bottom 31 and a wall 32. The bottom 31 is painted or electroplated as a surface to reflect light. A light source 40 is positioned over the bottom 31, and thus the bottom 31 can upwardly reflect light emitted by the light source 40.

The upper housing 11 has a protruding fringe 111 for accommodating the roller 22 within the opening 112. The roller can transmit to light to create visual effect. The button plate 13 is mounted over the upper housing 11, and the upper housing 11 has two integrated flexible portions 131 for pressing up and down so as to push a corresponding block 114a of an arm 114 on the upper housing 11. Each of the flexible portions 131 has a stopper 131a, which is fitted into the opening 113 for limiting the up and down movement of the corresponding flexible portion 131. Once the user presses one of the flexible portions 131, the block 114a will be pushed and activate a corresponding microswitch 23.

Figure 3:
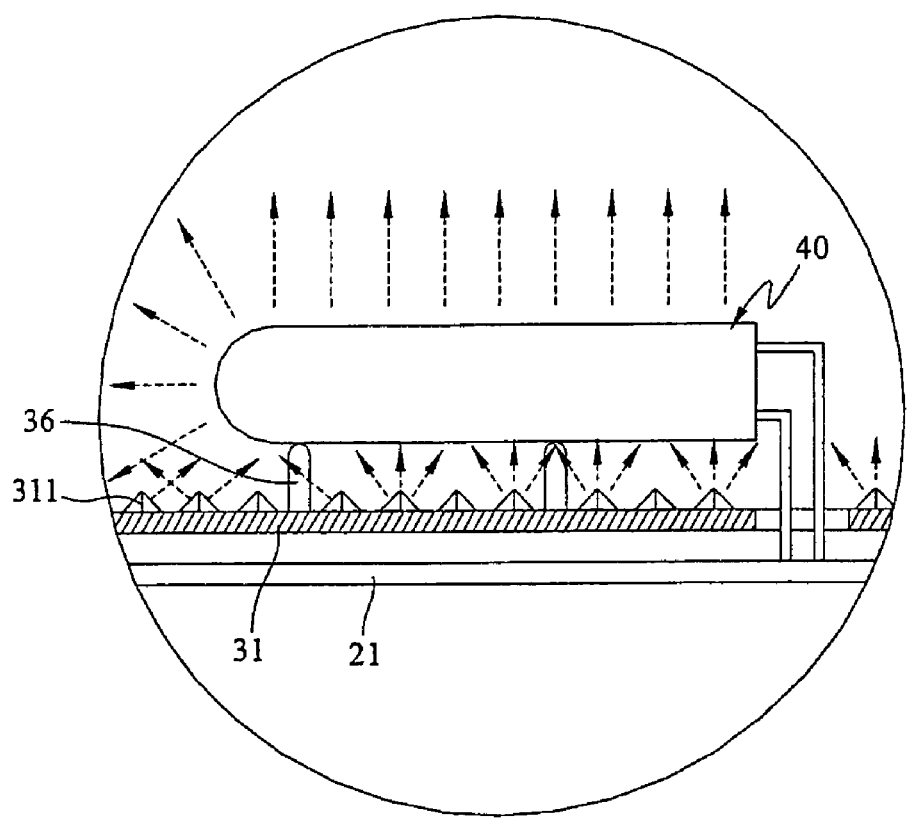
FIG. 3 is a side view showing the homogenizing effect of the tube and reflective surface included in the first preferred embodiment.
Figure 4:
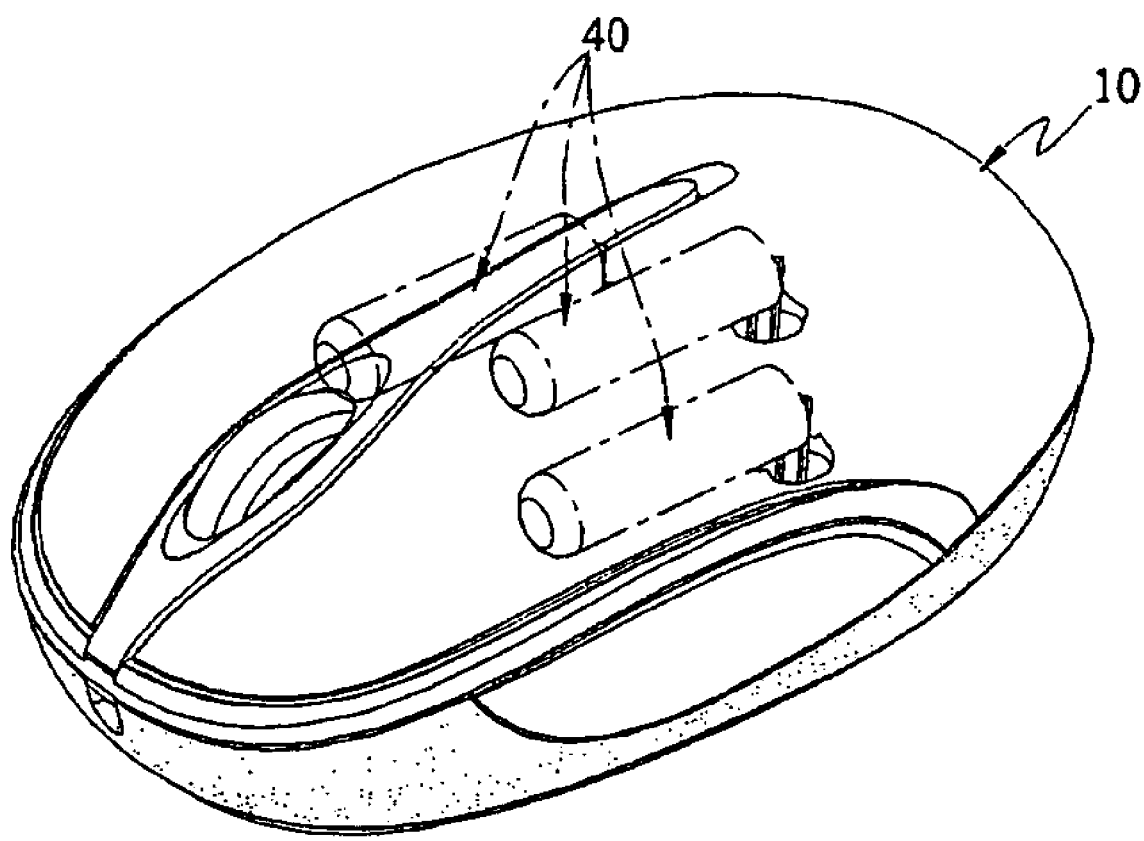
FIG. 4 is a perspective view of an assembled peripheral device according to the first preferred embodiment.
Figure 5:
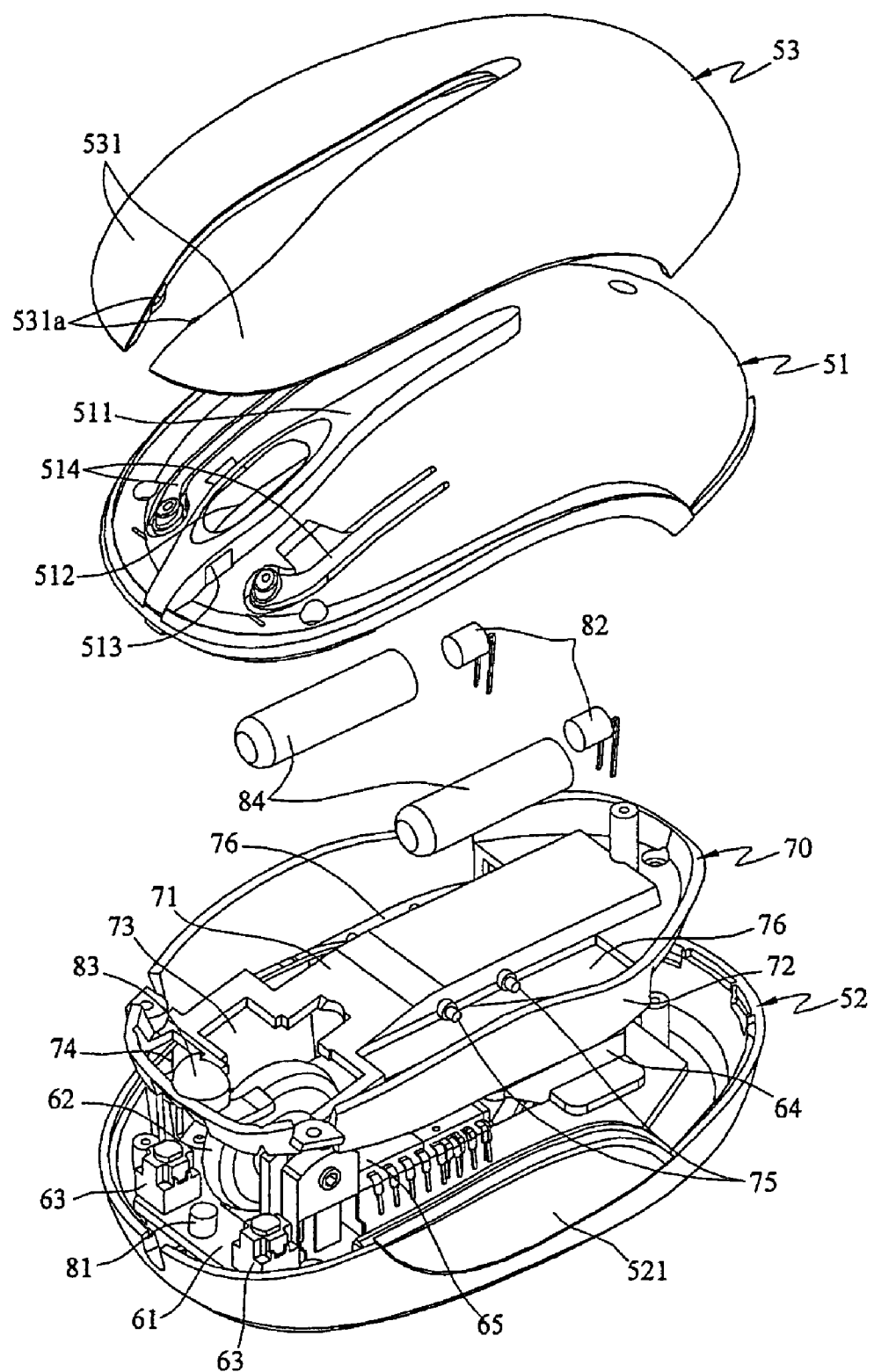
FIG. 5 is an exploded perspective view of a peripheral device constructed in accordance with the principles of a second preferred embodiment of the invention.
Figure 6:
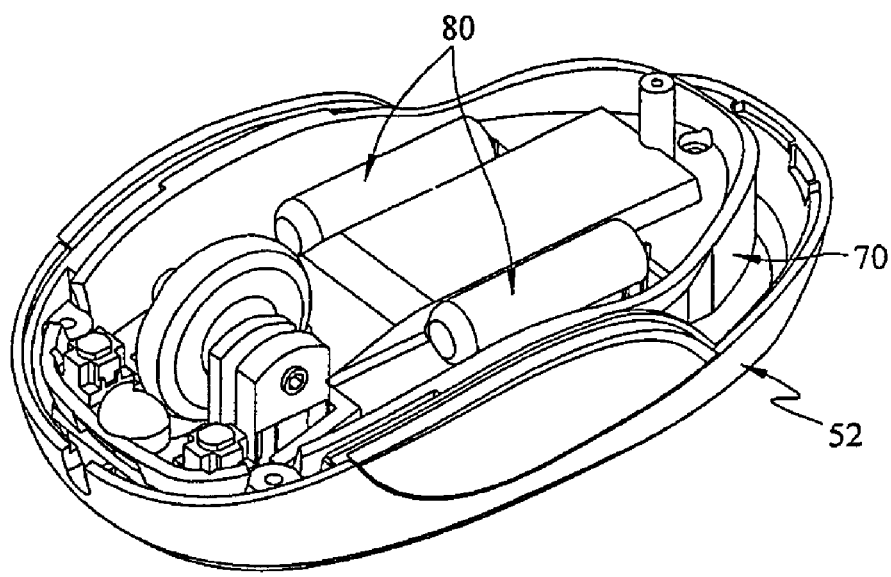
FIG. 6 is a perspective view of a lower part of the peripheral device of the second preferred embodiment.
Figure 7:
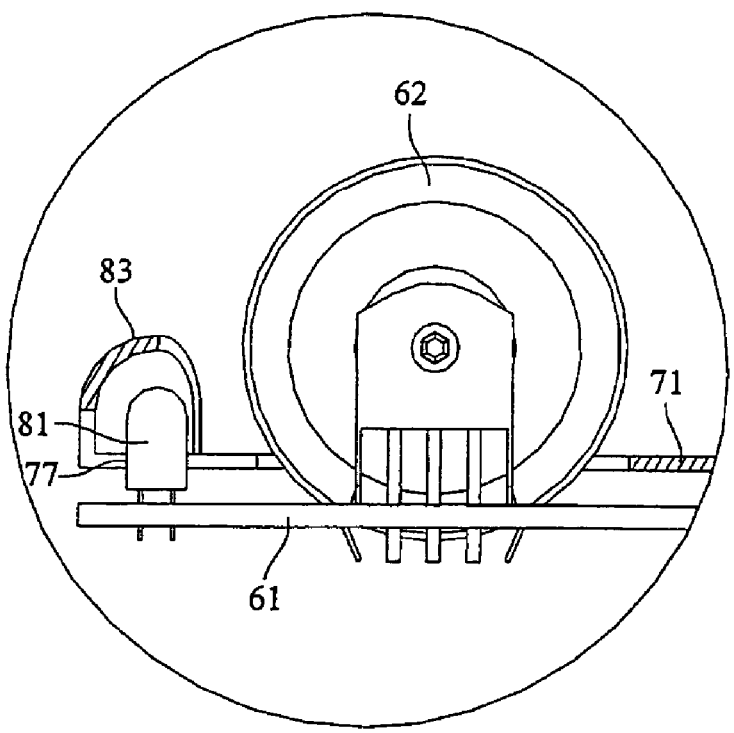
FIG. 7 is a side view of a portion of the second preferred embodiment.
Figure 8:
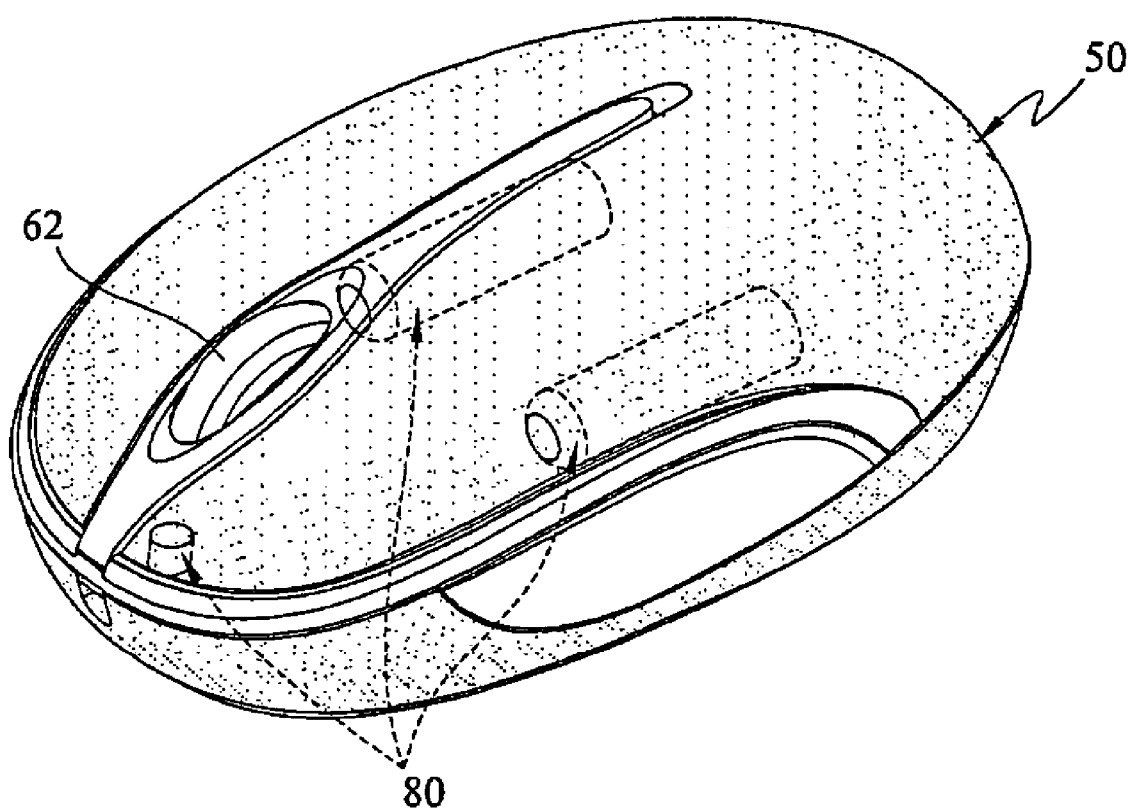
FIG. 8 is a perspective view of an assembled peripheral device according to the second preferred embodiment.

The reflecting device 30 is positioned under the light source 40. The bottom 31 has openings 35 for allowing a corresponding LED 41 to couple to the PCB 21, and an opening 33 for accommodating roller 22. In the first embodiment as best shown in FIG. 3, an uneven surface 311 is formed on the surface of bottom 31. In order to provide and improved homogenized light effect, the light source 40 comprises a LED 41, and a tube 42 for containing the LED inside. The tube 42 is made of a light pervious material which may possibly scatter the beam of the LED in a foggy or diffuse manner. In addition, the wall 32 can be designed as a reflecting or non-reflecting surface.

By the structure mentioned above, when the LED 41 emits light beam in the tube 42, the tube 42 will scatter the light beam inside the body 10. The reflecting device 40 will reflect the scattered light upward to the upper housing 11. Therefore, the button plate 13 will generate a visual effect of homogeneous light.

The second embodiment is shown in FIGS. 5~8. The peripheral device is also illustrated by a mouse, which comprises a body 50 including an upper housing 51, a lower housing 52 and a button plate 53. The upper housing 51, the lower housing 52 or the button plate 53 can be selected from a transparent, translucent, and opaque material, and/or painted to achieve a desired appearance. Also the surface of the body 50 can be further processed to form a smooth, rough or foggy effect. In addition, the visual effects can be created following the skill disclosed in U.S. Pat. No. 6,547,420 to display a trademark or logo thereon.

The body 50 further comprises a PCB 61 for furnishing essential known functions of the mouse, a roller 62, microswitches 63, and a coordinate detecting module 64 and 65 that couples to the PCB 61. The mouse may function in a manner corresponding to the roller mouse described in U.S. Pat. No. 5,530,455.

A reflecting device 70 positioned over the PCB 61 has a bottom 71 and a wall 72. The bottom 71 is painted or electroplated as a surface to reflect light. A light source 80 is positioned over the bottom 71, and thus the bottom 71 can upwardly reflect light emitted by the light source 80.

The upper housing 51 has a protruding fringe 511 for accommodating the roller 62 within the opening 512. The roller 62 can transmit light to create visual effects. The button plate 53 is mounted over the upper housing 51, and the upper housing 51 has two integral flexible portions 531 for pressing up and down so as to push a corresponding arm 514 on the upper housing 51. Each of the flexible portions 531 has a stopper 531a, which is fitted into the opening 513 for limiting the up and down movement of the flexible portion 531. Once the user presses one of the flexible portions 531, the arm 514 will be pushed down and activate a corresponding microswitch 53.

The reflecting device 70 is positioned under the light source 80. The bottom 71 has openings 76 for allowing a corresponding LED 41 to couple to the PCB 61, and an opening 73 for accommodating roller 22 therein. The protrusion 75 can support the light source 80 at a horizontal position. However, the reflecting device 70 is somewhat different from the first embodiment shown in FIG. 1 in that the reflecting device 70 has a smooth or mirror-like surface to reflect the light from the light source 80. The light source 80 may contain a first light source 81 and second light source 82. In the second embodiment, the button plate 53 and the lower housing 52 may be opaque to block the light coming from the light source 80. Also, the lateral pad 521, roller 62 and the protruding fringe 511 may be arranged to transmit light. Therefore, when the light source 80 begins emitting light, the body 50 will just allow the wall 72, the front frame, the lateral pad 521, the roller 62, and the protruding fringe 511 to emit light to the surroundings.

In order to improve the homogeneous light effect, the light source 80 further comprises LEDs 81, 82, and a tubes 83, 84 for containing the corresponding LEDs inside. The tubes 83, 84 are made of a light transmitting material which may possibly scatter the beam of the LED in a foggy or diffuse manner. By the structure mentioned above, when the LED 41 emits light beams in the tubes 83 and 84, the tubes 83 and 84 will scatter the light beams inside the body 50. The reflecting device 70 will reflect the scattered light other than to the lateral side of the lower housing 52, the protruding infringe 511, and the roller 62, so as to generate a visual effect of homogeneous light.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A computer mouse with a housing, the computer mouse comprising
   a circuit board arranged within the housing to provide functions of the mouse;
   a light source within the housing for generating light;
   a cylindrical light-diffusing tube surrounding said light source; and
   a reflecting device within the housing below said cylindrical light-diffusing tube;
   wherein the reflecting device reflects light from the light source toward the housing and causes at least a portion of the housing to emit the light homogeneously.

2. The mouse as claimed in claim 1, wherein a bottom of the reflecting device has a smooth surface to reflect the light.

3. The mouse as claimed in claim 1, wherein a bottom of the reflecting device has an uneven surface to reflect the light.

4. The mouse as claimed in claim 1, wherein the housing has a button plate for activating a corresponding microswitch within the housing.

* * * * *